(12) United States Patent
Stockbridge et al.

(10) Patent No.: US 9,573,440 B2
(45) Date of Patent: Feb. 21, 2017

(54) ENGINE THROTTLE POSITION SENSOR CALIBRATION

(71) Applicant: Carrier Corporation, Farmington, CT (US)

(72) Inventors: Michael Stockbridge, Canastota, NY (US); John R. Reason, Liverpool, NY (US); John T. Steele, Marcellus, NY (US)

(73) Assignee: CARRIER CORPORATION, Farmington, CT (US)

( * ) Notice: Subject to any disclaimer, the term of this patent is extended or adjusted under 35 U.S.C. 154(b) by 120 days.

(21) Appl. No.: 14/371,026

(22) PCT Filed: Mar. 6, 2013

(86) PCT No.: PCT/US2013/029308
§ 371 (c)(1),
(2) Date: Jul. 8, 2014

(87) PCT Pub. No.: WO2013/134355
PCT Pub. Date: Sep. 12, 2013

(65) Prior Publication Data
US 2015/0013357 A1    Jan. 15, 2015

Related U.S. Application Data

(60) Provisional application No. 61/608,879, filed on Mar. 9, 2012.

(51) Int. Cl.
| | |
|---|---|
| *F02D 41/24* | (2006.01) |
| *B60H 1/32* | (2006.01) |
| *B60P 3/20* | (2006.01) |
| *F02D 41/02* | (2006.01) |

(52) U.S. Cl.
CPC .......... *B60H 1/3222* (2013.01); *B60H 1/3226* (2013.01); *B60H 1/3232* (2013.01); *B60P 3/20* (2013.01); *F02D 41/0205* (2013.01); *F02D 41/2432* (2013.01)

(58) Field of Classification Search
CPC ... B60H 1/3208; B60H 1/3222; B60H 1/3232; B60H 1/3226; B60P 3/20; F02D 41/2432; F02D 41/0205; F02D 35/00
USPC ......... 123/339.16, 339.17, 339.18, 376, 399; 701/103; 62/230
See application file for complete search history.

(56) References Cited

U.S. PATENT DOCUMENTS

| | | |
|---|---|---|
| 4,719,794 A | 1/1988 | Ruiz |
| 4,899,549 A | 2/1990 | Berge |
| 4,999,781 A | 3/1991 | Holl et al. |
| 5,079,946 A | 1/1992 | Motamedi et al. |
| 5,123,252 A | 6/1992 | Hanson |
| 5,123,253 A | 6/1992 | Hanson |
| 5,163,399 A | 11/1992 | Bolander |

(Continued)

FOREIGN PATENT DOCUMENTS

| | | |
|---|---|---|
| EP | 0575197 A1 | 12/1993 |
| EP | 0584856 A2 | 3/1994 |

(Continued)

OTHER PUBLICATIONS

International Preliminary Report on Patentability for application PCT/US2013/029308, mailed Sep. 9, 2014, 6 pages.

*Primary Examiner* — Hai Huynh
(74) *Attorney, Agent, or Firm* — Cantor Colburn LLP

(57) ABSTRACT

A method is provided for calibrating an engine throttle position sensor operation of a refrigeration system powered by a fuel fired engine.

15 Claims, 3 Drawing Sheets

(56) References Cited

U.S. PATENT DOCUMENTS

| | | |
|---|---|---|
| 5,275,144 A | 1/1994 | Gross |
| 5,438,516 A | 8/1995 | Neubauer |
| 5,546,755 A | 8/1996 | Kreiger |
| 5,608,632 A | 3/1997 | White |
| 6,027,031 A | 2/2000 | Reason et al. |
| 6,044,651 A | 4/2000 | Reason et al. |
| 6,095,488 A | 8/2000 | Semeyn, Jr. et al. |
| 6,148,627 A | 11/2000 | Reason et al. |
| 6,148,628 A | 11/2000 | Reason et al. |
| 6,196,012 B1 | 3/2001 | Reason et al. |
| 6,226,998 B1 | 5/2001 | Reason et al. |
| 6,301,911 B1 | 10/2001 | Reason et al. |
| 6,321,549 B1 | 11/2001 | Reason et al. |
| 6,321,550 B1 | 11/2001 | Chopko et al. |
| 6,321,592 B1 | 11/2001 | Bylsma et al. |
| 6,351,704 B1 | 2/2002 | Koerner |
| 6,405,550 B1 | 6/2002 | Reason et al. |
| 6,543,242 B2 | 4/2003 | Reason et al. |
| 6,701,282 B2 | 3/2004 | Ting et al. |
| 6,704,643 B1 | 3/2004 | Suhre et al. |
| 6,705,904 B2 | 3/2004 | Matsuda et al. |
| 7,036,485 B1 | 5/2006 | Koerner |
| 7,243,635 B2 | 7/2007 | Soshino et al. |
| 7,266,442 B2 | 9/2007 | Ting |
| 7,444,234 B2 | 10/2008 | Bauerle |
| 7,444,986 B2 | 11/2008 | Shute |
| 7,717,085 B1 | 5/2010 | Bauerle |
| 7,762,231 B2 | 7/2010 | Dugas |
| 7,798,128 B2 | 9/2010 | Bellistri et al. |
| 7,865,672 B2 | 1/2011 | Ito |
| 7,878,013 B2 | 2/2011 | Matsuno et al. |
| 7,912,621 B2 | 3/2011 | Bauerle |
| 7,957,882 B2 | 6/2011 | Morisset et al. |
| 2002/0108388 A1 | 8/2002 | Wilson et al. |
| 2007/0084444 A1 | 4/2007 | Bellistri |
| 2009/0007576 A1 | 1/2009 | Bsoissinot |
| 2010/0000241 A1 | 1/2010 | Kitano |
| 2010/0171364 A1 | 7/2010 | Awwad |
| 2010/0212337 A1 | 8/2010 | Taras et al. |
| 2010/0212628 A1 | 8/2010 | Li |
| 2010/0275879 A1 | 11/2010 | Garon et al. |
| 2010/0289273 A1 | 11/2010 | Steele et al. |
| 2010/0305794 A1 | 12/2010 | Foster |
| 2011/0195816 A1 | 8/2011 | Martin |
| 2011/0247350 A1 | 10/2011 | Awwad et al. |
| 2011/0288722 A1 | 11/2011 | Nicosia et al. |

FOREIGN PATENT DOCUMENTS

| | | |
|---|---|---|
| FR | 2771681 A1 | 6/1999 |
| WO | 9722852 A1 | 6/1997 |
| WO | 2011094099 A1 | 8/2011 |

ENGINE THROTTLE POSITION SENSOR CALIBRATION

BACKGROUND OF THE INVENTION

This disclosure relates generally to refrigeration systems having a compressor powered by a fuel-fired engine. More particularly, this disclosure relates to calibration of an engine throttle position sensor during operation of a fuel fired engine of a transport refrigeration system.

Fruits, vegetables and other perishable items, including meat, poultry and fish, fresh or frozen, are commonly transported in the cargo box of a truck, a trailer, or in an intermodal container. Accordingly, it is customarily to provide a transport refrigeration system in operative association with the cargo box for cooling the atmosphere within the cargo box. The transport refrigeration system includes a refrigerant vapor compression system, also referred to as a transport refrigeration unit, and an on-board power unit. The refrigerant vapor compression system typically includes a compressor, a condenser, an expansion device and an evaporator serially connected by refrigerant lines in a closed refrigerant circuit in accord with known refrigerant vapor compression cycles. The power unit includes a fuel-fired engine, typically diesel fueled.

In many truck/trailer transport refrigeration systems, the compressor of the transport refrigeration unit is driven by the engine shaft either through a belt drive or by mechanical shaft-to-shaft link. More recently, all electric transport refrigeration systems have been developed for truck/trailer applications wherein the engine drives an on-board generator for generating sufficient electrical power to drive an electric motor operatively associated with the compressor of the transport refrigeration unit. For example, U.S. Pat. No. 6,223,546, assigned to Carrier Corporation, the same assignee to which this application is subject to assignment, the entire disclosure of which is incorporated herein by reference in its entirety, discloses an electrically powered transport refrigeration unit powered by an engine driven synchronous generator capable of producing sufficient power to operate the compressor drive motor and at least one fan motor. With respect to intermodal containers, clip-on power units, commonly referred to as generator sets or gensets, are available for mounting to the intermodal container, typically when the container is being transported by road or rail, to provide electrical power for operating the compressor drive motor of the transport refrigeration unit associated with the container. The genset includes a diesel engine and a generator driven by the diesel engine.

In conventional transport refrigeration systems, the control system is open loop in that the refrigeration system controller is unaware of the actual operating engine load. The fuel-fired engine is controlled by an electronic engine controller independently of the transport refrigeration unit which is controlled by a dedicated refrigeration unit controller. The electronic engine controller controls fuel flow to the engine so as to maintain the engine speed at a target RPM irrespective of the load imposed on the engine by the refrigeration unit. The refrigeration unit controller is unaware of the actual load being imposed on the engine and controls the refrigerant unit to meet cooling demand irrespective of the actual load on the engine.

SUMMARY OF THE INVENTION

In a closed-loop system wherein a refrigeration unit controller and an electronic engine controller are in communication, for the refrigeration unit controller to effectively adjust refrigeration load to match the available engine power, a need exists for a method for calibrating an engine throttle position sensor during operation of the transport refrigeration system so that the signal transmitted by the engine throttle position sensor is accurately indicative of the actual engine load.

A method is provided for calibrating an engine throttle position sensor during operation of a refrigeration system powered by a fuel fired engine. The method includes gradually increasing a load imposed by the refrigeration system on the fuel fired engine; monitoring a current sensed engine operating RPM and a current sensed engine throttle position signal; determining when the current engine operating RPM has dropped to a preset RPM calibration limit; defining the current sensed engine throttle position signal sensed coincident with the sensed engine operating RPM when the engine operating RPM has drooped to the preset RPM calibration limit as a recalibrated engine throttle position signal indicative of an engine throttle position of 100%; and applying the recalibrated engine throttle position signal indicative of an engine throttle position of 100%. Applying the recalibrated engine throttle position signal indicative of an engine throttle position of 100% may include sending a recalibration signal to an engine electronic control unit defining the recalibrated engine throttle position signal as indicative of an engine throttle position of 100%. Applying the recalibrated engine throttle position signal indicative of an engine throttle position of 100% may include developing an offset for correcting future engine throttle positions and applying the offset for correcting future engine throttle positions input into a refrigeration control algorithm for controlling the operation of the refrigeration system.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
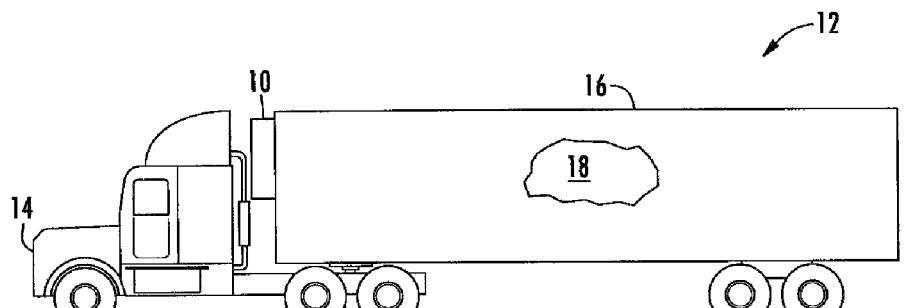
FIG. 1 is a view of a refrigerated trailer equipped with a transport refrigeration system.

The method for calibrating an engine throttle position sensor disclosed herein will be described in application on a transport refrigeration system 10 associated with a trailer 12 pulled by a tractor 14 as depicted in FIG. 1. The exemplary trailer 12 includes a cargo container/box 16 defining an interior space 18 wherein perishable product is stowed for transport. The transport refrigeration system 10 is operative to climate control the atmosphere within the interior space 18 of the cargo container/box 16 of the trailer 12. It is to be understood that the method disclosed herein may be applied not only to refrigeration systems associated with trailers, but also to refrigeration systems applied to refrigerated trucks, to intermodal containers equipped with gensets, and to other refrigeration systems including a refrigerant unit having an engine driven compressor.

Figure 2:
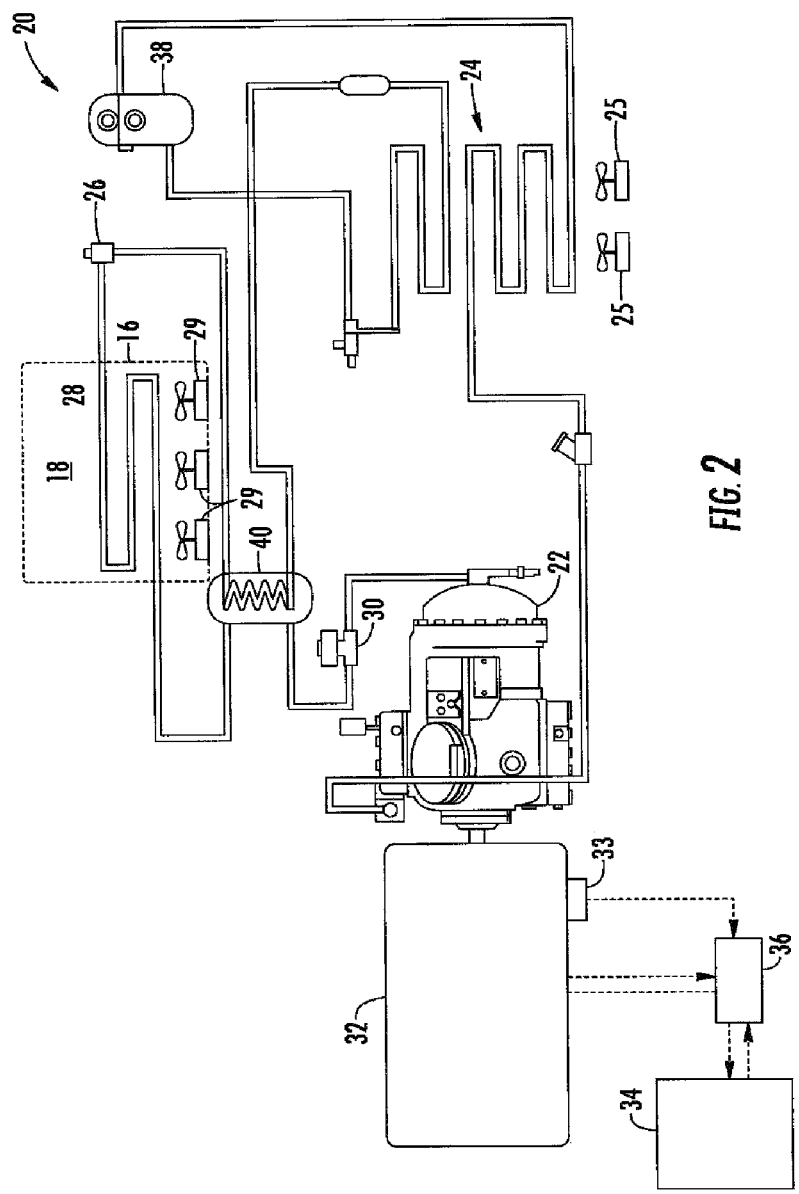
FIG. 2 is a schematic diagram of an embodiment of a transport refrigeration system wherein the compressor is directly driven by a fuel-fired engine.
Figure 3:
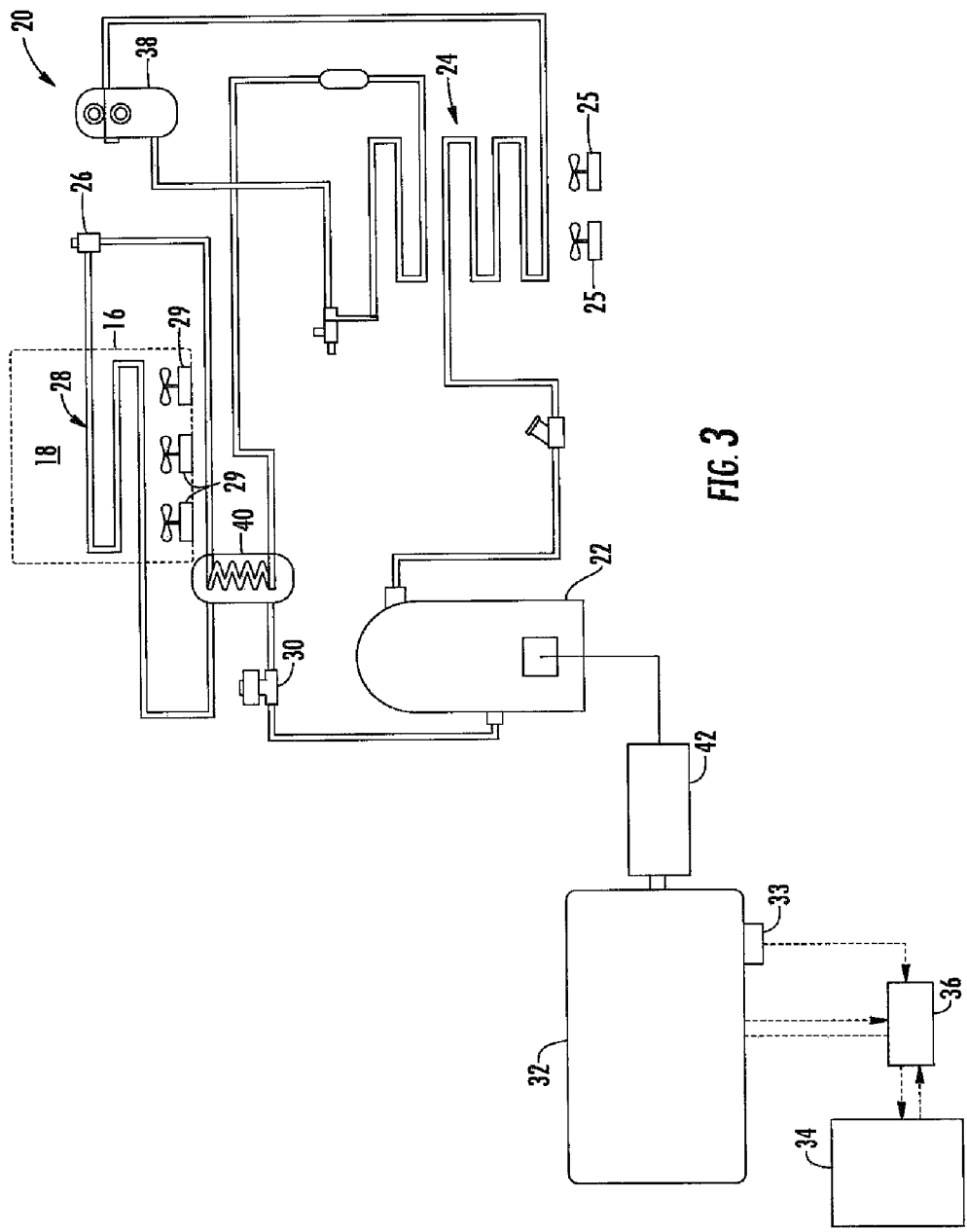
FIG. 3 is a schematic diagram of an embodiment of a transport refrigeration system wherein the compressor is driven by a motor powered by an electric generator driven by a fuel-fired engine.

Referring to FIGS. 2 and 3 of the drawing, there are depicted exemplary embodiments of transport refrigeration systems for cooling the atmosphere within the cargo box of a truck, trailer, container, intermodal container or similar cargo transport unit. The transport refrigeration system 10 includes a transport refrigeration unit 20 including a compressor 22, a refrigerant heat rejection heat exchanger 24 (shown as a condenser in the depicted embodiments) with its associated fan(s) 25, an expansion device 26, a refrigerant evaporator heat exchanger 28 with its associated fan(s) 29, and a suction modulation valve 30 connected in a closed loop refrigerant circuit and arranged in a conventional refrigeration cycle. The transport refrigeration system 10 further includes a diesel engine 32 equipped with an engine throttle position sensor 33, an electronic refrigeration unit controller 34 and an electronic engine controller 36. The transport refrigeration system 10 is mounted as in conventional practice to an exterior wall of the truck, trailer or container with the compressor 22 and the condenser heat exchanger 24 with its associated condenser fan(s) 25, and diesel engine 32 disposed externally of the refrigerated cargo box 16.

As in conventional practice, when the transport refrigerant unit 20 is operating in a cooling mode, low temperature, low pressure refrigerant vapor is compressed by the compressor 22 to a high pressure, high temperature refrigerant vapor and passed from the discharge outlet of the compressor 14 to circulate through the refrigerant circuit to return to the suction inlet of the compressor 22. The high temperature, high pressure refrigerant vapor passes into and through the heat exchange tube coil or tube bank of the condenser heat exchanger 24, wherein the refrigerant vapor condenses to a liquid, thence through the receiver 38, which provides storage for excess liquid refrigerant, and thence through the subcooler coil of the condenser heat exchanger 24. The subcooled liquid refrigerant then passes through a first refrigerant pass of the refrigerant-to-refrigerant heat exchanger 40, and thence traverses the expansion device 26 before passing through the evaporator heat exchanger 28. In traversing the expansion device 26, which may be an electronic expansion valve ("EXV") as depicted in FIGS. 2 and 3, or a mechanical thermostatic expansion valve ("TXV"), the liquid refrigerant is expanded to a lower temperature and lower pressure prior to passing to the evaporator heat exchanger 28.

In flowing through the heat exchange tube coil or tube bank of the evaporator heat exchanger 28, the refrigerant evaporates, and is typically superheated, as it passes in heat exchange relationship return air drawn from the cargo space 18 passing through the airside pass of the evaporator heat exchanger 28. The refrigerant vapor thence traverses a second refrigerant pass of the refrigerant-to-refrigerant heat exchanger 40 in heat exchange relationship with the liquid refrigerant passing through the first refrigerant pass thereof. Before entering the suction inlet of the compressor 22, the refrigerant vapor passes through the suction modulation valve 30 disposed downstream with respect to refrigerant flow of the refrigerant-to-refrigerant heat exchanger 40 and upstream with respect to refrigerant flow of the suction inlet of the compressor 22. The refrigeration unit controller 34 controls operation of the suction modulation valve 30 and selectively modulates the open flow area through the suction modulation valve 30 so as to regulate the flow of refrigerant passing through the suction modulation valve to the suction inlet of the compressor 22. By selectively reducing the open flow area through the suction modulation valve 30, the refrigeration unit controller 30 can selectively restrict the flow of refrigerant vapor supplied to the compressor 22, thereby reducing the capacity output of the transport refrigeration unit 20 and in turn reducing the power demand imposed on the engine 32.

Air drawn from within the cargo box 16 by the evaporator fan(s) 29 associated with the evaporator heat exchanger 28, is passed over the external heat transfer surface of the heat exchange tube coil or tube bank of the evaporator heat exchanger 28 and circulated back into the interior space 18 of the cargo box 16. The air drawn from the cargo box is referred to as "return air" and the air circulated back to the cargo box is referred to as "supply air". It is to be understood that the term "air' as used herein includes mixtures of air and other gases, such as for example, but not limited to nitrogen or carbon dioxide, sometimes introduced into a refrigerated cargo box for transport of perishable product such as produce.

In the embodiment of the transport refrigeration system depicted in FIG. 2, the compressor 22 comprises a reciprocating compressor having a compressing mechanism (not shown) mounted on a shaft that is directly coupled to and driven by the fuel-fired engine 32. In this embodiment, the fan(s) 25 and the fan(s) 29 may also be driven by the fuel-fired engine 32 through a belt or chain drive. Additionally, the engine 32 may also power an alternator, again through a belt or chain drive, to generate electric current for powering the refrigerant unit controller and other on-board electrical or electronic components of the transport refrigeration system 10.

In the embodiment of the transport refrigeration system depicted in FIG. 3, the compressor 22 comprises a semi-hermetic scroll compressor having an internal electric drive motor and a compression mechanism having an orbital scroll mounted on a drive shaft driven by the internal electric drive motor that are all sealed within a common housing of the compressor 22. The fueled-fired engine 32 drives an electric generator 42 that generates electrical power for driving the compressor motor which in turn drives the compression mechanism of the compressor 22. The drive shaft of the fueled-fired engine drives the shaft of the generator 42. In this embodiment, the fan(s) 25 and the fan(s) 29 may be driven by electric motors that are supplied with electric current produced by the generator 42. In an electrically powered embodiment of the transport refrigeration system 10, the generator 42 comprises a single on-board engine driven synchronous generator configured to selectively produce at least one AC voltage at one or more frequencies.

In an embodiment, the fueled-fired engine 32 comprises a diesel fueled piston engine, such as for example a diesel engine of the type manufactured by Kubota Corporation. However, it is to be understood that virtually any engine may be used that meets the space requirements and is capable of powering the compressor 22 or the generator 42. By way of example, the engine 32 may comprise a diesel fueled piston engine, a gasoline fueled piston engine, a natural gas or propane fuel piston engine, as well as other piston or non-piston engines that are fuel-fired.

As noted previously, the transport refrigeration system 10 also includes an electronic refrigeration unit controller 30 that is configured to operate the transport refrigeration unit 20 to maintain a predetermined thermal environment within the interior space 18 defined within the cargo box 16 wherein the product is stored during transport. The controller 30 maintains the predetermined thermal environment by selectively activating and deactivating the various components of the refrigerant vapor compression system, including the compressor 22, the fan(s) 25 associated with the condenser heat exchanger 24, the fan(s) 29 associated with the evaporator heat exchanger 28, and various valves in the refrigerant circuit, including but not limited to the suction modulation valve 30 to selectively varying the refrigeration load capacity of the transport refrigeration unit 20.

In one embodiment, the refrigeration unit controller 34 includes a microprocessor and an associated memory. The memory of the controller 34 may be programmed to contain preselected operator or owner desired values for various operating parameters within the system. The programming of the controller is within the ordinary skill in the art. The controller 34 may include a microprocessor board that includes the microprocessor, an associated memory, and an input/output board that contains an analog-to-digital converter which receives temperature inputs and pressure inputs from a plurality of sensors located at various points throughout the refrigerant circuit and the refrigerated cargo box, current inputs, voltage inputs, and humidity levels. The input/output board may also include drive circuits or field effect transistors and relays which receive signals or current from the controller 34 and in turn control various external or peripheral devices associated with the transport refrigeration system. The particular type and design of the controller 34 is within the discretion of one of ordinary skill in the art to select and is not limiting of the invention.

The refrigeration unit controller 34 is also in communication with the electronic engine controller 36. For example, the refrigeration unit controller 34 may be in closed loop communication with the electronic engine controller 36 by way of a controller area network (CAN) system. The fuel-fired engine 32 includes an engine throttle position sensor 33 that senses in real-time the position of the engine throttle and generates an engine throttle position signal indicative of the then current actual engine throttle position value. For example, the engine throttle position sensor 33 may measure or sense a position of a mechanical fuel rack. The engine throttle position signal is transmitted to the electronic engine controller and is used by the electronic engine controller 36 as a feedback input in controlling operation of the fuel-fired engine 32. The engine throttle position value is indicative of the level of fuel flow being supplied to the fuel-fired engine 32 relative to the maximum permissible fuel flow. Therefore, the engine throttle position value may serve as a proxy or indicator of the actual loading on the engine 32 and correlates with available engine power. For example, an engine throttle position value of 100% would include that the fuel-fired engine is operating at maximum power output and thus no more power is available without risking engine overloading, engine RPM (engine revolutions per minute) droop, or engine stall.

The refrigeration unit controller 34 receives the engine throttle position value from the engine electronic control unit 36 based on the engine throttle position signal received from the engine throttle position sensor 33. The refrigeration unit controller 34 uses the received engine throttle position value as feedback to a refrigeration control algorithm in order to balance refrigeration load with the available engine power, the refrigerant unit controller 34 determines the operating load state of the engine 32.

In accordance with an aspect of the disclosure, the refrigeration unit controller 34 performs real-time calibration of the engine throttle position sensor 33 in order to ensure that system performance is not adversely impacted by an inaccurate engine throttle position signal. The refrigeration unit controller 34 may be configured to perform a calibration of the engine throttle position sensor 33 at periodic time intervals, for example after each interval of a preset number of elapsed hours of operation. Alternatively, the refrigeration unit controller 34 could also contain embedded logic to continuously monitor the engine throttle position value and the engine rpm in order to initiate a calibration event if the refrigeration unit controller 34 determines that the engine rpm is operating in a drooped state and simultaneously the engine throttle position value is less that 100%. The lack of correlation between the sensed engine rpm and the sensed engine throttle position value indicates an engine throttle position sensor 33 inaccuracy. The refrigerant unit controller 34 may also be configured to perform a calibration of the engine throttle position sensor 33 on operator demand.

Figure 4:
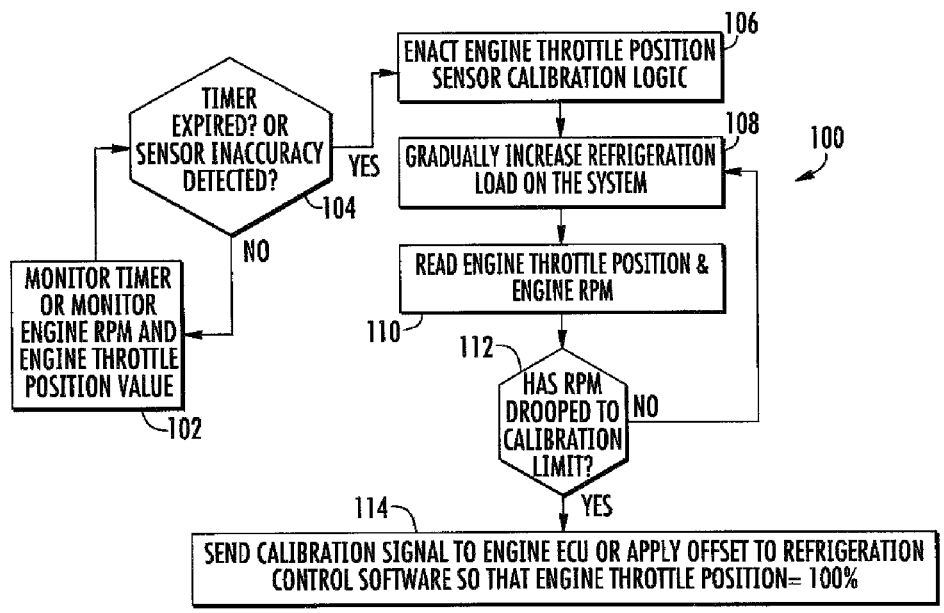
FIG. 4 shows a block diagram illustration of an embodiment of a method for calibrating an engine throttle position sensor as disclosed herein.

The refrigeration unit controller 34 may be configured to execute a calibration of the engine throttle position sensor 33 in accordance with the calibration procedure 100 as depicted in FIG. 4. At block 102, the controller 34 either monitors a calibration timer set to expire after a selected number of hours of operation or at a selected future time or monitors the engine rpm and the engine throttle position value. At block 104, the refrigeration unit controller 34 enacts an engine throttle position sensor calibration at step 106 when the timer expires or when a sensor inaccuracy has been detected based upon a lack of correlation between the sensed engine rpm and the sensed engine throttle position value.

At block 108, the refrigerant unit controller 34 gradually increases the refrigeration load on the refrigeration unit 20 so as to increase the refrigeration capacity demand on the compressor 22. To meet the increased refrigeration capacity demand, the compressor 22 will draw more power from the fuel fired engine 32, either through an increased shaft horsepower demand such as in the embodiment of FIG. 2 wherein the compressor 22 in driven directly by the engine 32 or through an increased current draw on the generator 42 such as in the embodiment depicted in FIG. 3 which in turn imposes an increased shaft horsepower demand on the engine 32. In response to the increased shaft horsepower demand, the engine electronic control unit 34 will call for more fuel to be supplied to the engine 32 to increase the horsepower output by the engine 32.

As the refrigeration unit controller 34 gradually increases the refrigeration load, the refrigeration unit controller 34 continually interrogates the engine ECU 36 for the then current engine operating RPM and for the engine throttle position value based on the then current engine throttle position signal received from the engine throttle position sensor 33, as designated at block 110. At block 112, the refrigeration unit controller 34 compares the then current engine operating RPM to a preset RPM calibration limit. The preset RPM calibration limit is set at an RPM level that is less than the normal engine operating RPM level. If the sensed engine operating RPM is at the normal engine operating RPM, it is known that the engine is not operating in an overload condition. However, if the sensed engine operating RPM has drooped to the preset RPM calibration limit, it is known that the engine 32 has moved into operation in an overload condition as a result of the increase in refrigeration unit load. Therefore, it is known that the engine throttle position must be at 100% position.

If the engine throttle position value received from the engine ECU 36 coincident with the engine operating RPM when the RPM drooped to the calibration limit is detected is not the same as the engine throttle position value originally calibrated to be indicative of the engine throttle position being at 100%, it is known that the engine throttle position sensor 33 is out of calibration and no longer providing a signal to the engine ECU 36 that accurately indicates the current engine throttle position. In response to a determination that the engine throttle position sensor 33 is out of calibration, the refrigeration unit controller, at block 114, takes one of two corrective actions. The refrigeration unit controller 34 may send a recalibration signal to the engine ECU 36 instructing the engine ECU 36 that the engine throttle position signal received from the engine throttle position sensor 33 coincident with the engine operating RPM when the RPM drooped to the calibration limit now indicates at an engine throttle position value of 100%. Alternatively, the refrigeration unit controller 34 may develop an offset for correcting future engine throttle position values received from the engine ECU 36 and apply the offset for correcting future engine throttle position values received from the engine ECU 36 and input into the refrigeration control algorithms used by the refrigeration unit controller 34 for controlling the operation of the transport refrigeration unit 20.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A method for calibrating an engine throttle position sensor during operation of a refrigeration system powered by a fuel fired engine, comprising:
    monitoring, at a refrigeration unit controller, a current sensed engine operating RPM and a current sensed engine throttle position signal;
    the refrigeration unit controller gradually increasing a load imposed by the refrigeration system on the fuel-fired engine;
    the refrigeration unit controller determining when the current engine operating RPM has drooped to a preset RPM calibration limit;
    the refrigeration unit controller defining the current sensed engine throttle position signal sensed coincident with the sensed engine operating RPM when the engine operating RPM has drooped to the preset RPM calibration limit as a recalibrated engine throttle position signal indicative of an engine throttle position of 100%; and
    applying the recalibrated engine throttle position signal indicative of an engine throttle position of 100%.

2. The method as set forth in claim 1 wherein applying the recalibrated engine throttle position signal indicative of an engine throttle position of 100% comprises sending a recalibration signal to an engine electronic control unit defining the recalibrated engine throttle position signal as indicative of an engine throttle position of 100%.

3. The method of claim 2, wherein the refrigeration unit controller and the engine electronic control unit are separate.

4. The method as set forth in claim 1 wherein applying the recalibrated engine throttle position signal indicative of an engine throttle position of 100% comprises developing an offset for correcting future engine throttle positions and applying the offset for correcting future engine throttle positions input into a refrigeration control algorithm for controlling the operation of the refrigeration system.

5. The method of claim 1 wherein the refrigeration system comprises a transport refrigeration system for conditioning an atmosphere within a mobile cargo box.

6. The method of claim 1 wherein the refrigeration system comprises a transport refrigeration system for conditioning an atmosphere within a cargo box of a trailer.

7. The method of claim 1, wherein gradually increasing the load imposed by the refrigeration system on the fuel-fired engine includes increasing a refrigeration capacity of a compressor, the compressor part of the refrigeration system, the compressor configured to compress refrigerant vapor to a higher pressure, higher temperature refrigerant vapor.

8. The method of claim 1, wherein the current sensed engine throttle position signal corresponds to a physical position of an engine throttle.

9. The method of claim 1, further comprising using the recalibrated engine throttle position signal for controlling at least one of the engine and the refrigeration system.

10. A system comprising:
    a fuel-fired engine including an engine throttle position sensor for measuring or sensing an operating position of the engine throttle; and
    a controller for calibrating the engine throttle position sensor during operation of the system, the controller configured to:
    monitoring a current sensed engine operating RPM and a current sensed engine throttle position signal;
    gradually increasing a load imposed on the fuel-fired engine;
    determining when the current engine operating RPM has drooped to a preset RPM calibration limit;
    defining the current sensed engine throttle position signal sensed coincident with the sensed engine operating RPM when the engine operating RPM has drooped to the preset RPM calibration limit as a recalibrated engine throttle position signal indicative of an engine throttle position of 100%; and
    applying the recalibrated engine throttle position signal indicative of an engine throttle position of 100%.

11. The system set forth in claim 10 further comprising a refrigeration system powered by the fuel-fired engine; and wherein increasing the load imposed on the fuel-fired engine comprises increasing the refrigeration load on the refrigeration system.

12. The system set forth in claim 11 wherein the refrigeration system comprises a transport refrigeration unit for conditioning an atmosphere within a cargo box of a refrigerated trailer.

13. The system of claim 10, wherein gradually increasing the load imposed on the fuel-fired engine includes increasing a refrigeration capacity of a compressor, the compressor part of a refrigeration system, the compressor configured to compress refrigerant vapor to a higher pressure, higher temperature refrigerant vapor.

14. The system of claim 10, wherein the current sensed engine throttle position signal corresponds to a physical position of an engine throttle.

15. The system of claim 10, wherein applying the recalibrated engine throttle position signal comprises controlling at least one of the engine and a refrigeration system.

\* \* \* \* \*